No. 750,531. PATENTED JAN. 26, 1904.
G. R. FORD & B. F. ALLEN.
ROLL GRINDING APPARATUS.
APPLICATION FILED MAR. 12, 1903.
NO MODEL. 2 SHEETS—SHEET 1.
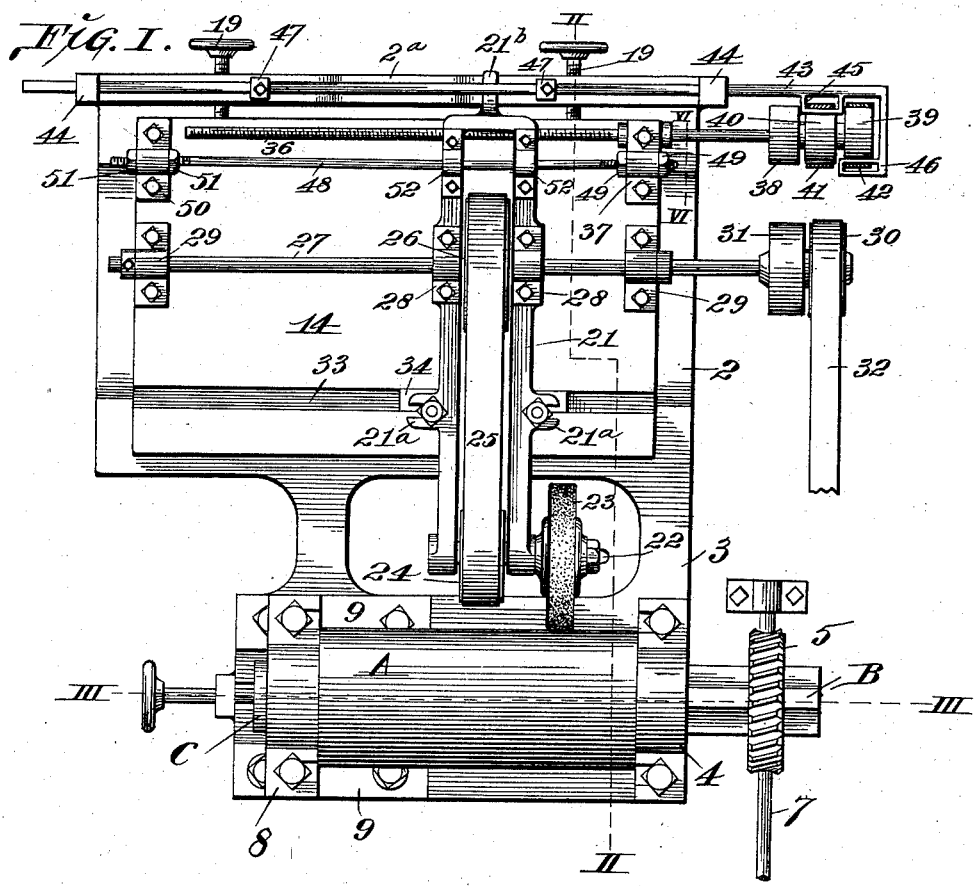
Fig. I.
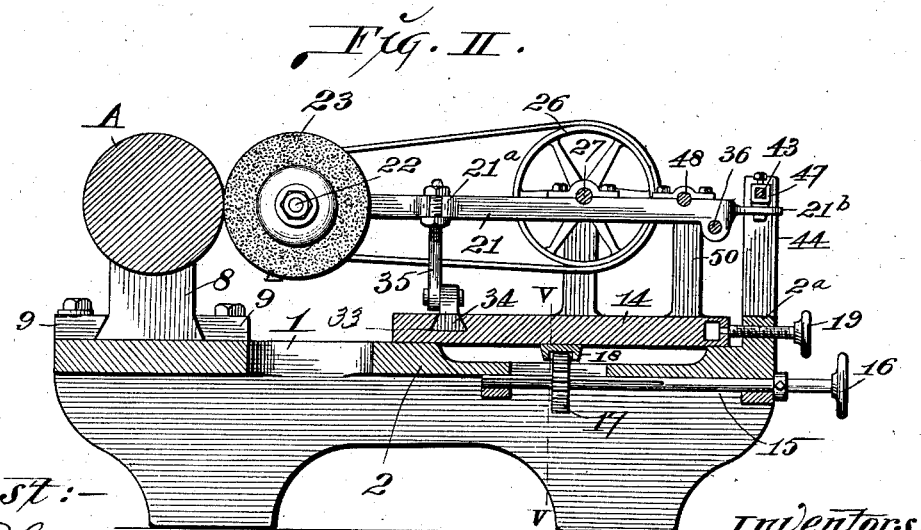
Fig. II.
Attest:
M. P. Smith
E. S. Knight
Inventors.
Geo. R. Ford, & B. F. Allen.
By Wright Bro
Atty's No. 750,531. PATENTED JAN. 26, 1904.
G. R. FORD & B. F. ALLEN.
ROLL GRINDING APPARATUS.
APPLICATION FILED MAR. 12, 1903.
NO MODEL. 2 SHEETS—SHEET 2.
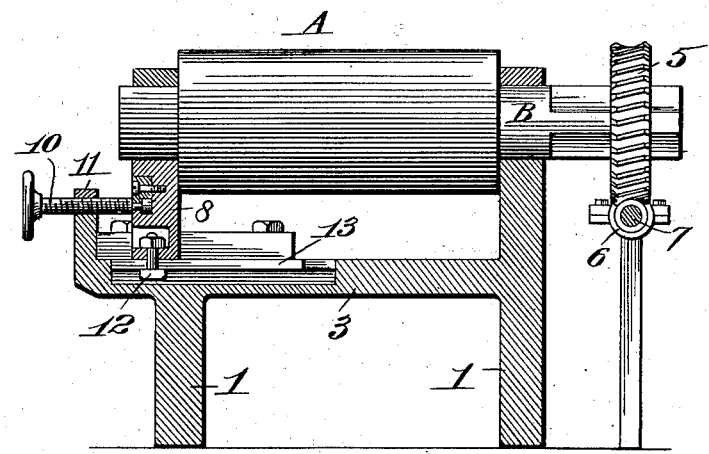
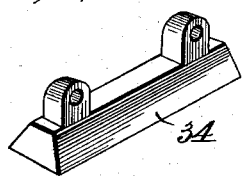
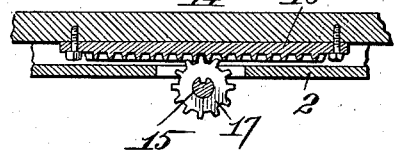
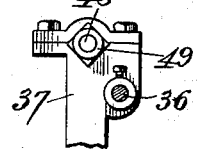
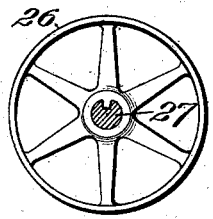
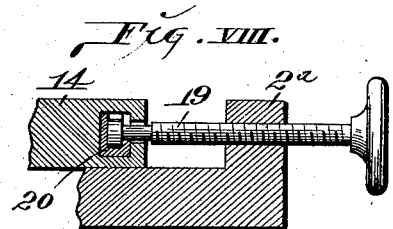
Attest:
M. T. Smith
E. S. Knight
Inventors:
Geo. R. Ford and
B. F. Allen
By Knight Bro.
Atty's.

No. 750,531.  Patented January 26, 1904.

UNITED STATES PATENT OFFICE.

GEORGE R. FORD AND BENJAMIN F. ALLEN, OF ST. LOUIS, MISSOURI; SAID ALLEN ASSIGNOR TO SAID FORD.

ROLL-GRINDING APPARATUS.

SPECIFICATION forming part of Letters Patent No. 750,531, dated January 26, 1904.

Application filed March 12, 1903. Serial No. 147,445. (No model.)

*To all whom it may concern:*

Be it known that we, GEORGE R. FORD and BENJAMIN F. ALLEN, citizens of the United States, residing in the city of St. Louis, in the State of Missouri, have invented certain new and useful Improvements in Roll-Grinding Apparatus, of which the following is a full, clear, and exact description, reference being had to the accompanying drawings, forming part of this specification.

Our invention relates to an apparatus for grinding or dressing mill-rolls with either straight, concave, or convex faces.

Our invention consists in features of novelty hereinafter fully described, and pointed out in the claims.

Figure I is a top or plan view of the apparatus. Fig. II is a vertical transverse section taken on line II II, Fig. I. Fig. III is a vertical longitudinal section taken on line III III, Fig. I. Fig. IV is a perspective view of the grinding-wheel-carriage shoe. Fig. V is a section taken on line V V, Fig. II. Fig. VI is a side view of the upper end of the guide-rod and feed-screw standard, the feed-screw being shown in cross-section taken on line VI VI, Fig. I. Fig. VII is a side view of the grinding-wheel driving-pulley with its shaft shown in cross-section. Fig. VIII is an enlarged section of fragments of the forward part of the apparatus-bed and movable bed-plate thereon, one of the bed-plate shifting-screws being shown in elevation.

1 designates the legs of the apparatus which support the bed 2, that has a rear extension 3. On the extension 3 is a standard 4, in which the spindle B of the roll A to be operated upon is journaled. This spindle receives a worm-wheel 5, that is engaged by the worm 6, carried by a drive-shaft 7. (See Figs. I and III.) The spindle C of the roll A is journaled in a movable tail-stock 8, that is positioned between guide-bars 9, secured to the bed extension 3, and is adapted to be shifted to and fro longitudinally of said extension to vary the space between it and the standard 4 for the support of rolls of varying lengths. The tail-stock 8 is moved by a shift-screw 10, passing through an upright 11, surmounting the bed extension 3 and having its inner end seated in the tail-stock. When properly positioned to support the roll, the tail-stock is held by an anchor-bolt 12, that is arranged for movement in a slot 13, contained by the bed extension 3. (See Fig. III.)

14 designates a carriage bed-plate that is loosely seated on the bed 2 and is adapted to be moved longitudinally of said bed through the medium of a rotatable rod 15, provided with a hand-wheel 16 and carrying a pinion 17, that is fitted to the rod and engages a flanged rack 18, secured to the under side of the bed-plate 14. Upon the rotation of the rod 15 the pinion 17 by its engagement with the rack 18 effects reciprocation of the bed-plate 14 to shift it longitudinally of the roll A that is to be operated upon.

19 designate adjustment-screws passing through screw-threaded apertures in an upright $2^a$ of the bed and having their inner ends seated in slides 20, located in the forward edge of the bed-plate 14. Through manipulation of these adjustment-screws 19 the bed-plate 14 may be shifted toward and away from the roll A to be operated upon.

21 designates a grinding-wheel carriage positioned transversely of the bed-plate 14 and having journaled in its rear end a shaft 22, that carries a grinding-wheel 23, the peripheral face of which is presented to the roll A, as seen in Figs. I and II. The shaft 22 bears a pulley 24, that receives a belt 25, which leads thereto from a drive-pulley 26, feathered to a drive-shaft 27, that (see Fig. VII) passes loosely through journal-boxes 28, fitted to the grinding-wheel carriage 21 and journaled in boxes 29, surmounting the bed-plate 14. The drive-shaft 27 is equipped with tight and loose pulleys 30 and 31, that receive the power-transmission belt 32, leading from a suitable source of power medium. In the bed-plate 14 is a dovetail groove 33.

34 is a dovetail shoe adapted to reciprocate in said groove 33 and having connected thereto links 35, that extend upwardly and engage in forks 21, projecting from the grinding-wheel carriage 21.

36 is a carriage feed-screw, journaled in a standard 37, surmounting the carriage bed-plate 14 and extending longitudinally of said plate. This feed-screw passes through screw-threaded apertures in the forward end of the grinding-wheel carriage 21 to upon its rotation impart reciprocation to said carriage and convey the grinding-wheel 23 along the face of the roll A to be operated upon. During such reciprocation of the carriage it is supported by the drive-shaft 27 and the shoe 34. The feed-screw 36 is equipped with a pair of tight pulleys 38 and 39 and a loose pulley 40, located intermediate of said tight pulleys. (See Fig. 1.)

41 and 42 are drive-belts adapted to travel on the tight pulleys 38 and 39 and either of which is designed to be shifted onto the intermediate loose pulley when the other is in service for the actuation of the feed-screw 36.

43 is a shift-rod reciprocally positioned in standards 44, surmounting the bed 2 at its forward side. This shift-rod carries loops 45 and 46, through which the belts 41 and 42 pass and by which they are adapted to be shifted from one pulley to another upon the reciprocation of said shift-rod.

47 designates adjustable trip-collars mounted on the shift-rod 43 and spaced apart a distance corresponding to the length of the roll-surface to be turned or dressed by the grinding-wheel 23. These trip-collars are upon the completion of movement of the grinding-wheel carriage 21 in each direction engaged by a tripper-arm 21$^b$, carried by the forward end of the grinding-wheel carriage 21. When this tripper-arm strikes the trip-collar, toward which it is moved in the reciprocation of the grinding-wheel carriage, the shift-rod 43 is reciprocated in a direction corresponding to the movement of the carriage and the belt 41 or 42 previously operating on the tight pulley 38 or 39 to rotate the feed-screw 36 is shifted onto the loose pulley 40, and the other belt previously on said loose pulley is shifted onto its tight pulley to effect reverse rotation of the feed-screw and impart reverse reciprocation to the grinding-wheel carriage. In this manner the grinding-wheel carriage is reciprocated to and fro continuously throughout the roll-grinding operation.

48 designates a guide-rod through the medium of which the grinding-wheel carriage is directed in a straight course or in a curving path during its reciprocation, thereby providing for the grinding of the roll A with either a straight face or a concave or convex face. One end of this guide-rod is held in a fixed position in the standard 37 through means of nuts 49 and the opposite end of which is rigidly mounted in a standard 50 and held by nuts 51. (See Figs. I and II.) This guide-rod may be either of straight form or of curving form, and it is removably secured in the standards 37 and 50, so that it may be withdrawn therefrom and replaced by a guide-rod having a different contour or so that it may be turned in its support to present its curvature in the opposite direction to that in which it was previously used. As shown in Fig. I of the drawings, the guide-rod is of curved form, with the curvature extending rearwardly toward the roll to be operated upon, and its utility will be first described in connection with such illustration. The rod passes loosely through boxes 52, carried by the grinding-wheel carriage 21. As a consequence of this loose engagement between the guide-rod and the grinding-wheel carriage the carriage is caused to deviate from a straight course during its reciprocation to and fro longitudinally of the bed-plate 14, with the result that the grinding-wheel 23 is moved in a curving path along the face of the roll operated upon and the course of its path is rearward throughout the central portion of its travel and forward at the ends of its travel, thereby causing the wheel to produce a concave surface upon the roll which is being rotated through the medium of the mechanism provided for that purpose. When it is desired to grind the roll with a convex surface, the guide-rod 48 is turned and again secured with its curvature extending forwardly instead of rearwardly, as seen in Fig. I, and then upon the reciprocation of the grinding-wheel carriage the grinding-wheel will act upon the roll in a direction curving forwardly at the center of the roll and rearwardly at its ends and grind the roll of convex form, as will be readily understood. Should it be desired to grind a roll with a straight face instead of either a concave or convex face, the curved guide-rod may be removed and a straight rod introduced in its place, when the course of reciprocation of the grinding-wheel carriage will correspond to the straight contour of the guide-rod and the roll be correspondingly turned.

We claim as our invention—

1. In an apparatus of the character described, the combination of a roll-support, a grinding-wheel carriage, means for reciprocating said carriage, a grinding-wheel journaled to said carriage, means for driving said grinding-wheel, and a guide-rod passing through said carriage to direct its course, substantially as set forth.

2. In an apparatus of the character described, the combination of a roll-support, a grinding-wheel carriage, means for reciprocating said carriage, a grinding-wheel journaled to said carriage, means for driving said grinding-wheel, and a curved guide-rod passing through said carriage to direct its course, substantially as set forth.

3. In an apparatus of the character described, the combination of a roll-support, a grinding-wheel carriage, a grinding-wheel journaled to said carriage, means for driving said grinding-wheel, means for reciprocating said carriage, a bed-plate, a shoe reciprocally positioned in said bed-plate, connections between said shoe and said carriage, and a guide-rod having its ends secured to said bed-plate and passing loosely through said grinding-wheel carriage, substantially as set forth.

GEO. R. FORD.
BENJAMIN F. ALLEN.

In presence of—
E. S. KNIGHT,
M. P. SMITH.